METHOD FOR ELECTROPOLISHING SEMICONDUCTING MATERIAL

Filed April 25, 1957 3 Sheets-Sheet 1

INVENTOR
D.R. TURNER
BY Edwin B. Cave
ATTORNEY

Jan. 27, 1959 D. R. TURNER 2,871,174

METHOD FOR ELECTROPOLISHING SEMICONDUCTING MATERIAL

Filed April 25, 1957 3 Sheets-Sheet 2

INVENTOR
D. R. TURNER
BY Edwin B. Cave
ATTORNEY

Jan. 27, 1959 D. R. TURNER 2,871,174

METHOD FOR ELECTROPOLISHING SEMICONDUCTING MATERIAL

Filed April 25, 1957 3 Sheets-Sheet 3

INVENTOR
D. R. TURNER
BY Edwin B. Cave
ATTORNEY

United States Patent Office 2,871,174

Patented Jan. 27, 1959

2,871,174

METHOD FOR ELECTROPOLISHING SEMICONDUCTING MATERIAL

Dennis R. Turner, Murray Hill, N. J., assignor to Bell Telephone Laboratories, Incorporated, New York, N. Y., a corporation of New York Application April 25, 1957, Serial No. 655,097

1 Claim. (Cl. 204—140.5)

This invention relates to methods for electropolishing semiconducting material, and relates particularly to methods for electropolishing silicon in an aqueous solution.

In the processing of silicon, for use in semiconductor devices or in other applications, it is often necessary to shape the material or to remove damaged surface portions by the use of chemical or electrochemical methods. After processing, it is desirable that the silicon be polished, assuring a flaw-free surface. In any surface treatment, including polishing, electrochemical techniques are usually preferred to chemical treatments because the former give greater control over the amount of surface material being removed and the place from which it is removed.

Electropolishing involves the establishment of a thin bright continuous film, described as either a solid or highly viscous liquid layer, at a metal surface. The film is formed by making the metal the anode of a cell containing an electrolyte conducive to anode film formation. Smoothing of the surface occurs by the differential solution of the film at high points on the surface. Brightening is ascribed to a random transfer of metal atoms into vacant cation sites in the anode film.

Electrolytes suitable for electropolishing silicon are extremely few in number. The paper by Uhlir in the Bell System Technical Journal, volume 35, page 333 (1956), describes electropolishing of silicon in non-aqueous baths of ethylene glycol containing hydrofluoric acid. The same author reports that silicon does not electropolish in aqueous solutions of HF because of thick anode deposits formed on the silicon surface. Some other aqueous solutions used in attempts to electropolish silicon also prove ineffective. For example, solutions of strong alkali, which chemically attack silicon, form passive surface layers on silicon when used as electrolytes for electropolishing. What is required is an electrolyte in which an electropolishing film formed on a silicon anode is sufficiently soluble to permit controlled removal of the film, but not so soluble that no film can be built up.

It has now been discovered that silicon can be successfully electropolished in aqueous solutions of hydrofluoric acid if current densities within a critical range are used in the process. Such a finding is contrary to the generally-accepted opinion that anodically-biased silicon is too active in aqueous solutions to be polished without the formation of undesired non-polishing films of silicon compounds on the submerged surface.

As known in the art, conduction in extrinsic semiconductive n-type silicon is by electron flow attributable to the presence of "donor" impurities such as phosphorus, arsenic, antimony, and bismuth in the silicon. On the other hand, conduction in p-type materials is by hole movement, and is favored by the presence of "acceptor" materials such as aluminum, gallium, indium, and boron as impurities in the silicon bulk. The electropolishing method to be described is equally applicable to both n-type and p-type silicon semiconductor materials. However, as described in the paper of Turner, Journal of the Electrochemical Society, volume 103, page 252 (1956), the anodic biasing of an n-type semiconductor creates an internal voltage barrier in the material, causing heating when a polishing current is passed. Since a rise in temperature increases the minimum critical current density needed for electropolishing, and an increase in current in turn gives still greater heating, refrigeration of the anode or electrolyte may eventually be required. Further, some pitting of n-type silicon anodes may occur. In consequence, the electropolishing of p-type silicon is the more feasible embodiment of the invention in practice and will be described herein as the preferred embodiment. The preferred embodiment includes anodes the bulk of which are of p-type silicon, though such anodes may have thin surface layers in whole or in part of n-type silicon. Difficulties in electropolishing are encountered when the anode is entirely n-type or predominantly n-type material. It is to be understood, nevertheless, that the same techniques here described for p-type silicon are applicable to n-type silicon, though are less conveniently practiced on the latter material.

Figures 1, 2:
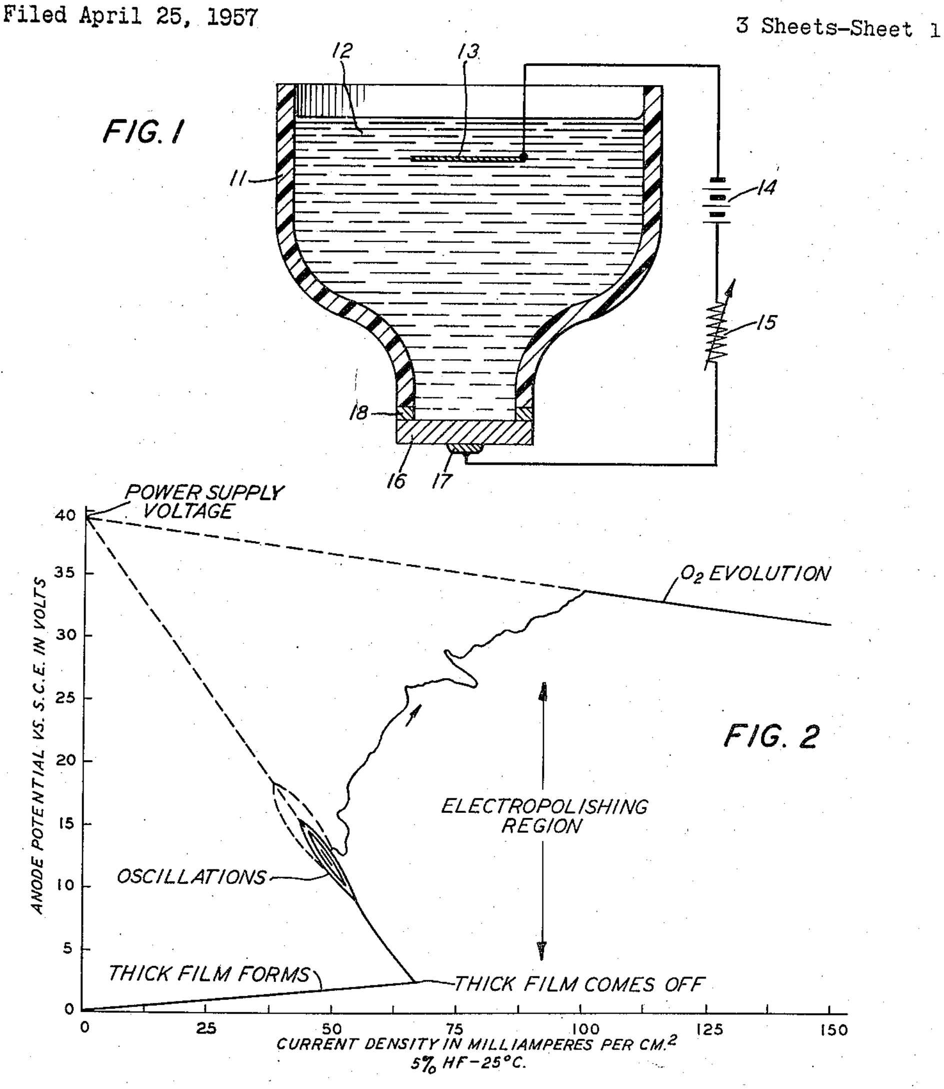
Fig. 1 is a drawing of a cell in which silicon can be electropolished and of a circuit suitable for electropolishing.
Fig. 2 is a plot of the anode potential of a p-type silicon anode plotted as a function of current density for a cell at 25° C. containing a 5 percent HF aqueous electrolyte.

In Fig. 1, 11 is a container made of a material, such as polyethylene, impervious to electrolyte 12 containing hydrofluoric acid. An inert cathode 13, conveniently of platinum is suspended in electrolyte 12, and biased negatively from voltage source 14. The positive terminal of voltage source 14 is connected with p-type silicon disc 16, which is the anode of the cell, by soldered contact 17 made to a nickel-plated portion of disc 16. Rubber gasket 18 is used to make a leakproof joint between container 11 and disc 16. Rheostat 15 is in the circuit in series with the electrolytic cell.

Fig. 2 shows a typical anode potential-current curve at 25° C. obtained in a cell, similar to that in Fig. 1, constructed with a horizontally-positioned circular piece of 3.5 ohm-centimeters p-type silicon 2.5 centimeters in diameter as anode, a 1 centimeter square sheet of platinum as cathode and an aqueous electrolyte containing 5 percent by weight of hydrofluoric acid. Anode potential is measured against a standard calomel electrode. The power supplied to the cell whose characteristics are plotted in the curve of Fig. 2 was that of two 45 volt batteries, with slide wire rheostats to control the current through the cell. As the current through the cell is gradually increased from a null value by lowering the rheostat resistance, a thick dark-colored film is formed on the silicon anode. At a critical anode current density, the film dislodges from the silicon surface and the anode potential increases while current flow temporarily decreases, due to the formation of a high resistance electropolishing film on the anode at this point. The slope of this portion of the current density curve is determined by the power supply voltage and rheostat resistance: the projection of the curve back to zero current (broken line) intersects the ordinate at the power supply voltage. After several minutes, oscillations in the anode potential and current density occur which, if uninterrupted, will continue until the current density drops to low values around 20 milliamperes per square centimeter. Electropolishing takes place throughout the period in which the oscillating current is observed. If the current density is now continuously increased by decreasing the rheostat resistance, erratic potential-current density relationships are observed, as seen in Fig. 2. At any point on this irregular line, if the rheostat resistance is kept at a fixed value, the anode potential tends to drift to the value of the power supply voltage. Finally, at a higher value of the current density, continuous oxygen evolution begins at the anode and the current density increases. In the range of potentials and current densities observed between the loosening of the initially-formed film and the evolution of oxygen, silicon is electropolished by the treatment described. The term "critical current density" as hereinafter used is defined as that minimum current density at the silicon anode of a cell at which an initially formed anode film, presumably consisting of compounds of divalent silicon, dislodges from the silicon surface and a bright, high resistance, electropolishing film forms. This critical current density value is associated with a discontinuous rise in the anode potential which signals entry of the system into the electropolishing range, no matter in what manner power is supplied to the cell. The non-polishing film initially formed may vary in thickness and in color. If current density is slowly increased up to the electropolishing region, thick brown or orange-red films are produced. By moving rapidly voltagewise into the electropolishing region, only thinner films of lighter color have time to be formed.

The voltage current curve of Fig. 2 is characteristic of electropolishing carried out in an unstirred solution. When the electrolyte is stirred, the potential-current density relationships are qualitatively similar, but the abrupt changes which occur at the initiation of electropolishing in unstirred solutions are not observed, and the critical current density generally has a higher value. A discontinuous rise in anode potential still accompanies the onset of electropolishing, however.

Figure 3:
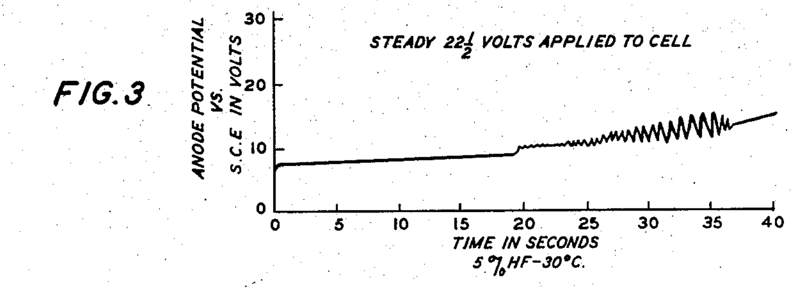
Fig. 3 is a plot of anode potential versus time for the steady application of a fixed voltage to a silicon anode in a 5 percent HF aqueous electrolyte at 30° C.
Figure 4:
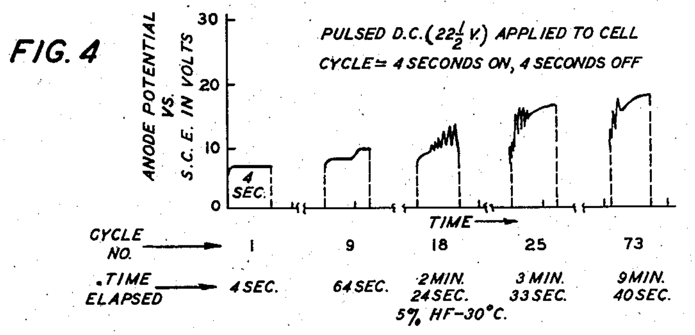
Fig. 4 is a plot of anode potential versus time for the pulsed application of a fixed voltage to a silicon anode in a 5 percent HF aqueous electrolyte at 30° C.

If a voltage sufficient to exceed the critical current density or anode potential needed for electropolishing is applied at once to the silicon anode, the anode potential and current will quickly pass into the electropolishing region after a short induction period. This is shown in Fig. 3, which records anode potential as a function of time after application of a 22½ volt source directly to the cell. Electropolishing is observed after a slight discontinuous increase in potential observable before the onset of oscillation. Fig. 4 shows the result of applying a pulsed direct-current voltage. During the 9th cycle of pulsing on a 4-second on 4-second off basis, a discontinuous rise in the anode potential is observed, and in subsequent pulses oscillation again ensues.

The simplest method of achieving an anode potential of at least about 2 volts, sufficient to electropolish silicon in aqueous HF, is by applying a constant voltage greater than 10 volts directly across a cell. Initially the current is large and is limited mainly by the electrolyte resistance. As the high resistance electropolishing film forms, the current drops and an increasing amount of the applied voltage appears across the electropolishing film. The potential between the silicon anode and the electrolyte automatically stays in the electropolishing region. The voltage applied to the cell may be applied as a steady direct-current voltage or as a pulsed voltage. Pulsing produces forced oscillations analogous to the oscillations observed when a steady voltage is applied, as in Fig. 2 for example. If pulsing is done, the pulses may have fixed "on" and "off" times, or may have a variable "on" time, e. g. the time required to reach a certain anode potential such as 15 volts. Pulsing may also be done by superimposing an alternating current on a steady direct current.

Figure 5:
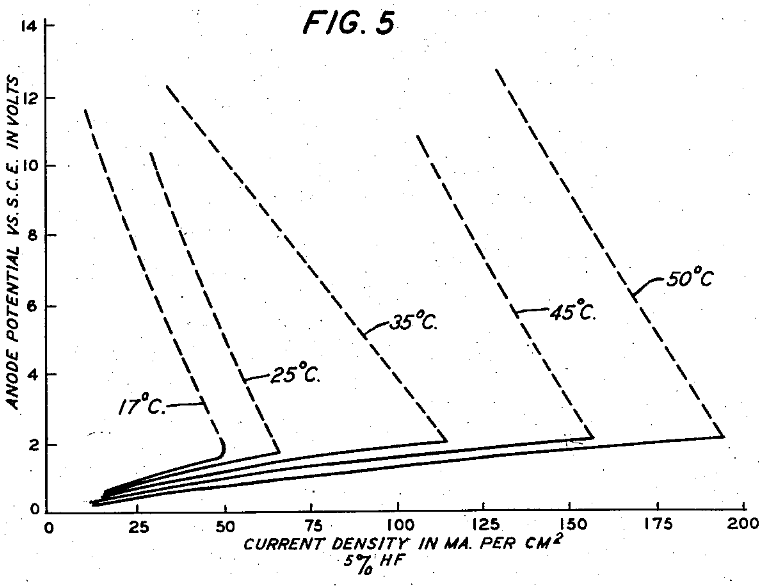
Fig. 5 is a plot of anode potential versus current density at a number of temperatures in a 5 percent HF aqueous electrolyte.

Fig. 5 shows the effect of temperature on the anode potential current density curve of Fig. 1. Passage into the electropolishing region occurs at higher and higher current densities as the temperature of the anode increases. This temperature was measured experimentally by soldering a thermistor directly to the anode.

Figure 6:
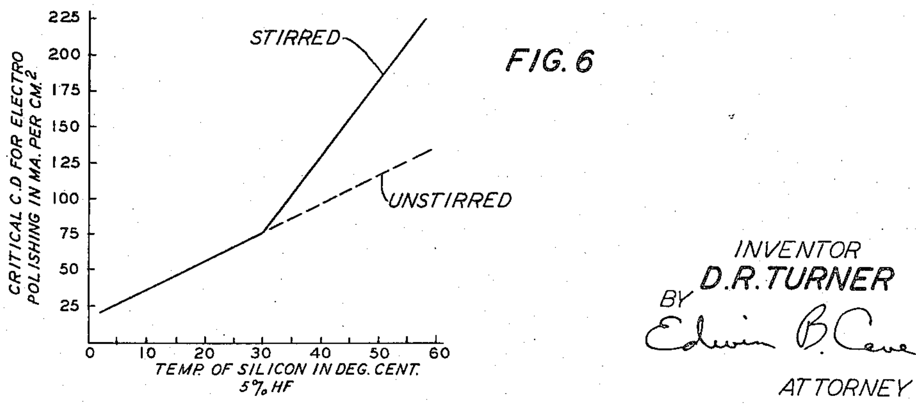
Fig. 6 is a plot of critical current density as a function of anode temperature in a 5 percent HF aqueous electrolyte.

In Fig. 6 the critical current density required for electropolishing is plotted as a function of anode temperature. The data refer to a cell such as that shown in Fig. 1 in which no mechanical stirring of the electrolyte is used. However, stirring does occur by convection when the anode temperature exceeds the temperature of the bulk of the electrolyte, kept at about 30° C. for these experiments. The onset of convection stirring at 30° C. changes the cell characteristics, giving a break in the curve of Fig. 6. The difference made by stirring is attributable to the mechanism of the electropolishing process, which proceeds by diffusion limited reactions. These may be either diffusion processes carrying anode products from the anode, or diffusion of a reactant to the anode: both would be affected by stirring. There are two current density-temperature relations, one each for the stirred and unstirred case. Where, as in the case shown in Fig. 4, an electrolyte is unstirred at one temperature and stirred at a different temperature, a break is observed as the system shifts from one relationship to the other. In general, stirring tends to increase the value of the critical current density needed for electropolishing.

Figure 7:
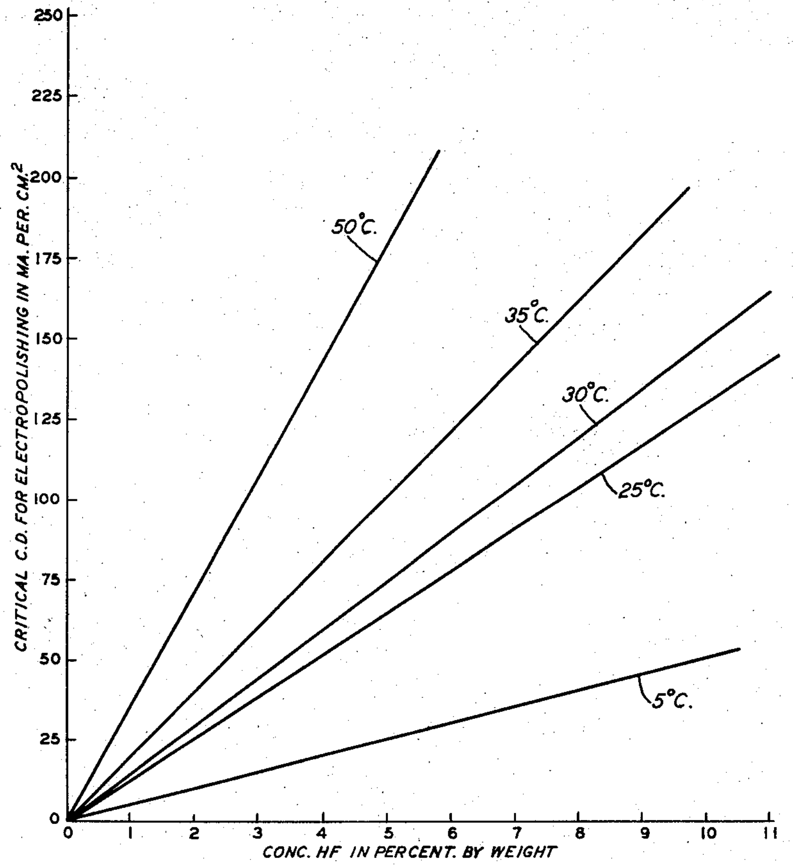
Fig. 7 is a plot of critical current density, at various temperatures, as a function of hydrofluoric acid concentration in an aqueous electrolyte.

In Fig. 7, the linear relation between critical current density and HF concentration in the electrolyte is shown at a number of temperatures. At very low HF concentrations cell resistance is high, the power dissipated is large, and there is a greater tendency toward etching of the anode than to electropolishing. For these reasons, a concentration of HF of at least 2 percent and preferably between 3 percent and 10 percent is generally used. An HF concentration of 5 percent has given especially good results. As shown in Fig. 7, the critical current density value increases with increasing HF concentration. At high HF concentrations and high current densities, heating of the anode is a problem. Because of excessive anode heating, a practical upper limit of 20 percent of HF in the electrolyte exists. However, the concentration range can be extended by refrigerating the anode and the electrolyte.

Figure 8:
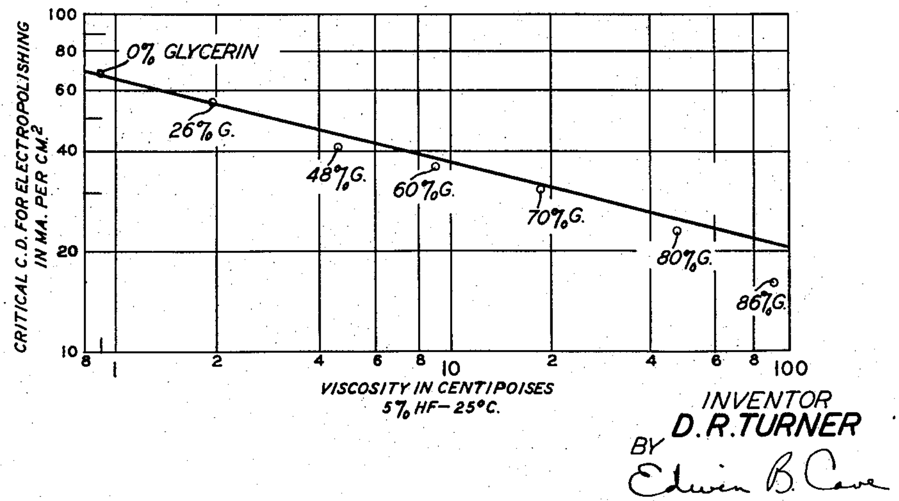
Fig. 8 is a plot of critical current density as a function of viscosity in an electrolyte containing 5 percent HF at 25° C.

Since the mechanism of electropolishing involves diffusion limited reactions, the viscosity of the electrolyte solutions has an effect on critical current density values as shown in Fig. 8. To determine the effect of viscosity, a series of water-glycerin solutions were prepared, with 5 percent by weight of HF, at 25° C. The more viscous solutions, containing larger amounts of glycerin, showed critical current densities at lower values. Nevertheless, purely aqueous and predominantly aqueous solutions give electropolishing in the absence of any non-aqueous materials or when only small amounts of non-aqueous materials are present. The addition of non-aqueous materials to the electrolyte increases the electrolyte resistance, requiring that higher voltages be applied to the cell. This usually results in overheating, and predominantly aqueous systems are preferred. By predominantly aqueous solutions are meant those which contain 50 percent or more by weight of water and non-organic solutes dissolved therein.

As shown in Figs. 5, 6 and 7, the value of the critical current density needed for electropolishing increases as the HF concentration, the anode temperature, or the viscosity of the electrolyte increases. Stirring, as mentioned, also increases the critical value. For an unstirred aqueous electrolyte at 30° C., critical current density is approximately related to HF concentration and temperature by the equation $$ic=C(0.40T+3.2)$$

where:

$ic$=critical current density in milliamperes per square centimeter
$C$=HF concentration in percent by weight
$T$=anode temperature.

Stirring will raise the critical current density requirement, so that the relationship defines a minimum critical current density needed for electropolishing in aqueous solutions.

Though specific embodiments have been therein shown and described it is understood that they are illustrative only and are not to be construed as limiting on the scope and spirit of the invention.

What is claimed is:

The method of electropolishing a p-type silicon surface which comprises biasing said surface anodically in an electrolyte consisting essentially of an aqueous solution of hydrofluoric acid containing from about 2 percent to about 10 percent by weight of hydrofluoric acid at a current density above that at which a dark film appears on the said surface.

References Cited in the file of this patent

UNITED STATES PATENTS

| | | |
|---|---|---|
| 2,375,394 | Tosterud | May 8, 1945 |

FOREIGN PATENTS

| | | |
|---|---|---|
| 530,041 | Great Britain | Dec. 4, 1940 |